No. 679,456. Patented July 30, 1901.
N. CURTIS.
VALVE.
(Application filed June 17, 1899.)
(No Model.) 2 Sheets—Sheet 1.
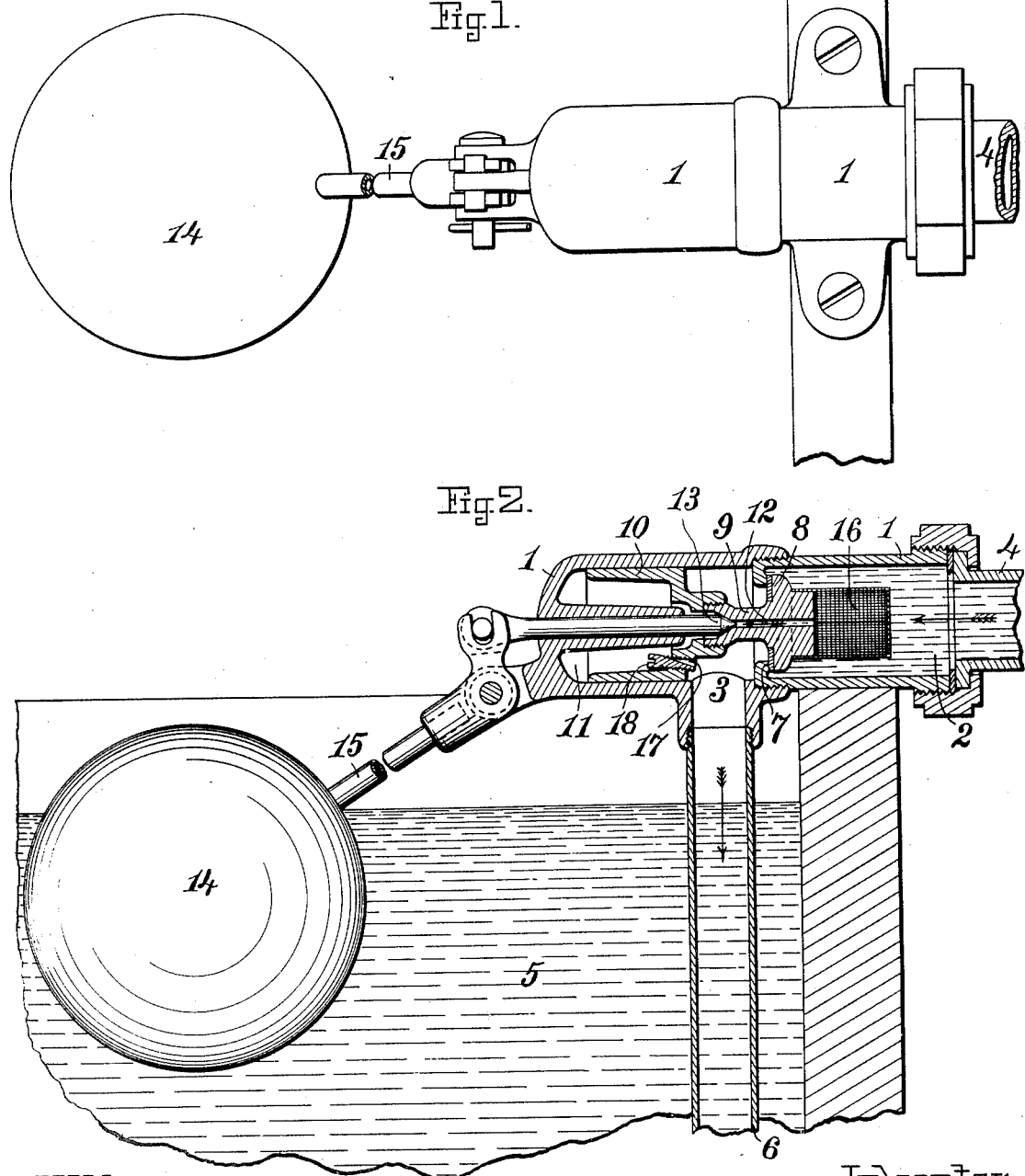
Witnesses
L Bayard Thompson.
Harry A. Lewis.
Inventor
Nelson Curtis
by
Henry Chadbourn
his atty.

No. 679,456.  
N. CURTIS.  
VALVE.  
(Application filed June 17, 1899.)  
Patented July 30, 1901.
(No Model.) 2 Sheets—Sheet 2.
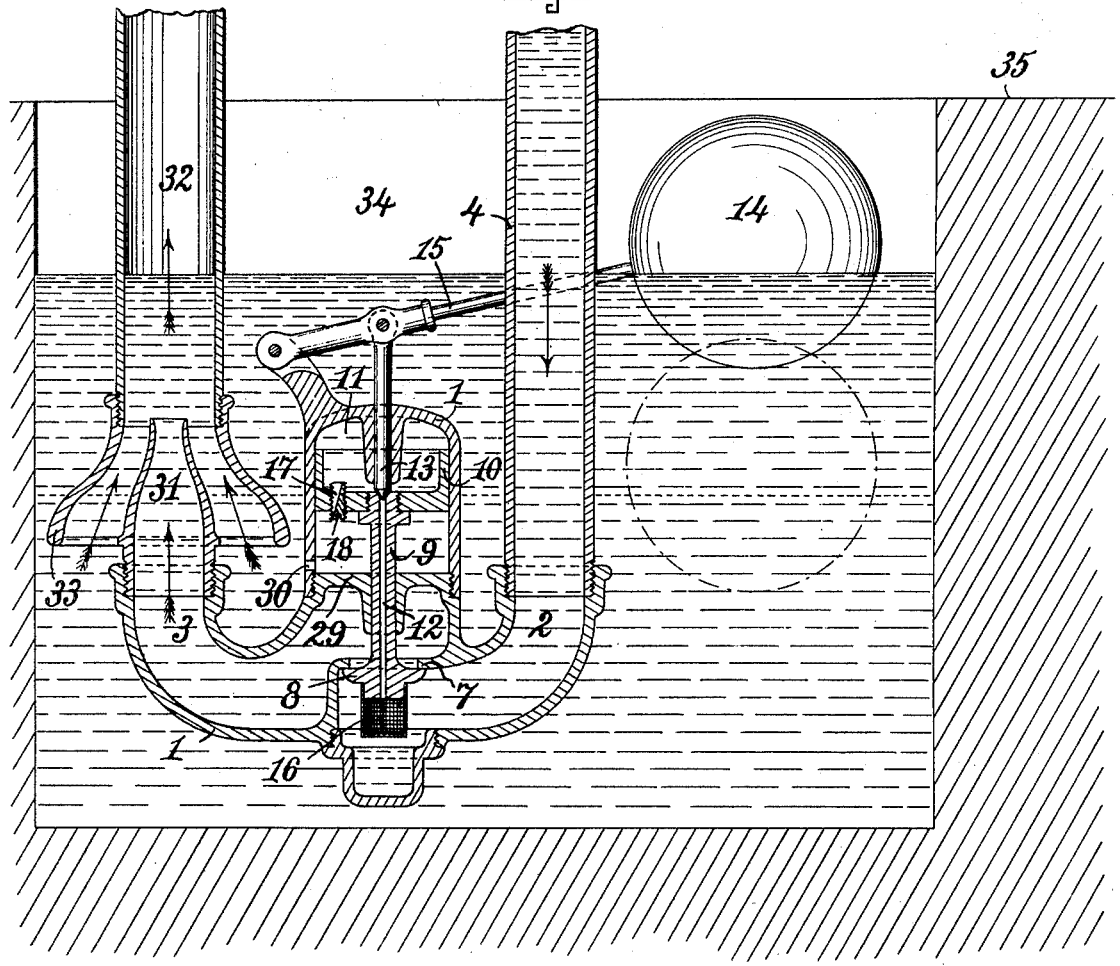
Witnesses  
S. Bayard Thompson  
Harry N. Squires
Inventor  
Nelson Curtis  
by Henry Chadbourn  
his atty.

UNITED STATES PATENT OFFICE.

NELSON CURTIS, OF BOSTON, MASSACHUSETTS.

VALVE.

SPECIFICATION forming part of Letters Patent No. 679,456, dated July 30, 1901.

Application filed June 17, 1899. Serial No. 720,996. (No model.)

*To all whom it may concern:*

Be it known that I, NELSON CURTIS, of Boston, in the county of Suffolk and State of Massachusetts, have invented certain new and useful Improvements in Valves, of which the following is a specification.

This invention relates to improvements in valves, and more especially in valves which are operated by a float or hollow ball which rises and falls with the rising and falling of the level of the liquid in the receptacle supplied from said valve.

The invention has for its object to produce a valve of this class which will open and close in a positive manner and be quick in its movements, one which will remain wide open until the desired level of the liquid in the receptacle has been obtained, and then will immediately and positively close, preventing the disagreeable dripping and drizzling common in valves now in use.

It consists of a main valve held upon its seat by the pressure of the liquid in the inlet of the valve or in the supply-pipe, a piston to cause the opening of the main valve by the inlet-pressure being applied to said piston, and a secondary valve controlling the inlet-pressure to said piston, it being held upon its seat by the influence of said float, whereby the valves will move in opposite directions when the secondary valve opens communication between the inlet and that side of said piston which will cause the main valve to be opened, thus making its action both rapid and positive when the valve is being opened, and whereby the valves will be moved in the same direction against the influence of the float by the action of the inlet-pressure on the main valve after the secondary valve has been closed by the action of said float, this action of the inlet-pressure on the main valve tending to submerge the float, and thereby to hold the secondary valve firmly closed, and overcomes any wave motion in the tank, tending to cause the dancing up and down of the float and intermitting opening and closing of the secondary valve; and it further consists in minor details of construction described hereinafter and claimed.

The invention is carried out substantially as illustrated on the accompanying drawings, which form an essential part of this specification, and whereon—

Figure 1 represents a plan view of my improved valve arranged as a ball-cock to automatically control the supply of water to a cistern or other receptacle. Fig. 2 represents a central longitudinal section of the valve shown in Fig. 1. Fig. 3 represents a central longitudinal section of my valve arranged as a valve in a device to automatically discharge water from a cellar or other cavity or excavation.

Similar characters of reference refer to similar parts wherever they occur on the different parts of the drawings.

Referring to my improved valve as illustrated in Figs. 1 and 2, in which it has been shown as used for a supply-valve or "ball-cock" to control the supply of water or other fluid to a cistern, tank, or other reservoir, the casing 1 is made of two parts and has an inlet-opening 2 and outlet-opening 3. A supply-pipe 4 is connected to and in open communication with the inlet-opening, and the outlet-opening communicates with the tank or cistern 5 either directly or by means of a pipe 6, prolonging said outlet. A valve-seat 7 is arranged within the casing between its inlet and outlet openings, which seat, in combination with a valve 8, controls communication between said inlet and outlet. This valve is so arranged that it will normally be held upon its seat to close communication between the inlet and outlet by means of the pressure of the fluid in the supply-pipe. Upon the stem 9 of the valve is a piston 10, which reciprocates within a cylindrical chamber 11 in the casing. This piston is of greater area than that of the valve 8 and is so arranged that its reciprocations will open or close the valve. A small passage 12 forms a communication between the supply-inlet and the cylindrical chamber 11 on that side of the piston 10 which is opposite to the valve 8. A secondary valve 13 controls the flow of fluid through this passage, and said valve is itself controlled by a float 14 on a float-lever 15 within the tank or cistern 5 to which the fluid is to be supplied from the supply-pipe 4. The valve 13 is moved longitudinally within a bearing in the casing toward or from the end of the passage 12 to open or close said passage in order to admit fluid from the inlet-pipe into the cylindrical chamber or to prevent the admission of such fluid thereto.

A strainer 16 is attached to the valve 8 in such a manner that it will form a filter to remove any particles from the water which enters the chamber 11 through the passage 12 and for a purpose to be understood by a further description of the device.

A passage 17 is provided which forms a communication between the chamber 11 and the outlet 3. On the drawings this passage has been made through the piston 10, and it is contracted more or less by means of a tapering slotted screw 18.

With the tank or cistern 5 filled with water or other fluid and the valve 8 closed and held upon its seat by the pressure of the fluid in the inlet-pipe 4 the operation of my improved valve in a ball-cock as above described, is as follows: If a quantity of the fluid is withdrawn from the tank or cistern, the ball moves downward, causing the secondary valve 13 to withdraw from the end of the passage 12, and thereby to open communication between the inlet and the chamber 11. Fluid from the inlet-pipe 4 under pressure immediately passes into the chamber 11 through the passage 12 and creates a pressure in this chamber which is substantially equal to that in the inlet. The pressure in the chamber 11 upon the piston 10 is in opposition to the pressure in the inlet upon the valve 8, and as the area of the piston is in excess of that of the valve it will be seen that the pressure on the piston will overcome that on the valve 8, and will cause the piston to move in a direction opposite to the movement of the secondary valve 13 when opening, which will cause the valve 8 to leave its seat 7 and allow fluid to enter the outlet, so as to be discharged into the tank or cistern through said outlet. The outlet 3 is of less area than the orifice through the valve-seat 7, and the piston 10 is so arranged that it gradually moves over said outlet and by reducing it cramps the flow of water through the same. Therefore there is a certain amount of back pressure created on the fluid which is between said valve-seat and outlet, which pressure will increase gradually as the piston moves over the outlet, but will always be slightly reduced from that in the inlet, and this pressure will act upon the piston 10 in opposition to the pressure on said piston caused by the pressure on the fluid in the chamber 11. The piston 10 will continue its movement, caused by the inlet-pressure in the chamber 11, and will force the valve 8 from its seat until the combined inlet-pressure on the valve 8 and the gradually-increasing back pressure on the piston caused by the movement of the piston, as above set forth, balances the inlet-pressure in the chamber 11, when the piston will remain in equilibrium, with the valve 8 open and with fluid being discharged through the outlet 3. This pressure in the outlet-chamber, in connection with the pressure on the valve 8, tends to seat said valve upon the seat 7 and to close communication between the inlet and outlet as soon as the supply of inlet-pressure is cut off from the chamber 11, which is the result when the secondary valve 13 is again seated upon the end of the passage 12; but the valve 8 cannot be seated while the valve 13 is withdrawn from the passage 12, and the valve 13 will remain open and supply pressure to the chamber 11 in opposition thereto until the fluid in the tank or cistern has reached the proper level. It will be understood that if there were no counteracting pressure brought to bear upon the piston against the inlet-pressure in the chamber 11 acting thereon the piston would continue its movement caused by said inlet-pressure until stopped by its coming into contact with the back of the valve-seat 7, and thereby close the passage of fluid through the valve-seat, as said piston is greatly increased in area over the orifice in the valve-seat. If the piston were provided with a fixed stop to limit its movement before it had reached the valve-seat and were so arranged that it did not move over the outlet 3 before it came to its stop, the valve 8 would be opened and closed in the same manner as above set forth, but the pressure on the fluid discharged through the outlet would be substantially that of the inlet-pressure. By so arranging the piston that it moves over the outlet 3 and gradually covers said outlet I am not only able to create a back pressure between the valve-seat and the outlet in order to bring the piston gradually into equilibrium and to limit its movement, but also to gradually reduce and control the pressure on the fluid discharged through said outlet by the reduction of said outlet by said piston. Therefore it will be seen that the piston acts as a controller of the pressure in the outlet, and consequently on the fluid discharged therefrom. When the fluid has reached the desired level, the float will have raised and moved the valve 13 so as to close the end of the passage 12, thus cutting off the supply of fluid from the chamber 11. The valve 8 will then be released from the influence of the pressure of the fluid in the chamber 11 upon the piston 10 and will be moved toward its seat by the influence of the pressure of the fluid in the inlet upon the valve and in the outlet-chamber upon the piston. This seating of the valve 8 can be accomplished only by the escape of the fluid which remained in the chamber 11 and was confined therein by the seating of the valve 13, as above set forth. The passage 17 forms a means of escape for said fluid, and the screw 18 regulates the flow of the fluid. Thus the valve 8 may be made to close more or less quickly by the operation of the screw 18.

From the above description of the valve, as shown in Figs. 1 and 2, it will be seen that the secondary valve is opened by a movement of said valve in the direction of the inlet-pressure on said valve and that the effect upon the main valve produced by the opening of this secondary valve is to cause the main valve to be opened by a movement in direct opposition to the inlet-pressure and to the movement of the secondary valve. It will also be seen that when the float has risen sufficiently to cause the secondary valve to be seated and to close the passage 12 while the main valve is in an open position it will permit the main valve, which is acted upon by the inlet-pressure, to be moved by the inlet-pressure, so as to be seated and shut off the supply of water to the tank. This movement of the main valve will cause the secondary valve to be carried with it in the same direction against the influence of the float, thus tending to keep the secondary valve closed and the float to be submerged to a greater extent than is necessary to produce the closing of the secondary valve. This extra submerging of the float tends to hold the secondary valve firmly upon its seat and prevents any wave motion which may be in the tank from intermittingly seating and unseating the secondary valve. Therefore it will be seen that when the secondary valve is once opened it is sure to cause the complete opening of the main valve, and when it has once reached its seat again it is sure to cause the closing of the main valve, making the action of the valve both positive and rapid and preventing the disagreeable prolonged dripping and chattering of the valve common in ball-cocks now in use, and by thus preventing the dripping and drizzling of the water through the main valve I prevent the cutting action of the water on said valve and its seat, and consequently obviate otherwise necessary repairs. As there is a very small area of the secondary valve exposed to the action of the inlet-pressure, there can be a very small float used to hold said valve upon its seat against said inlet-pressure, and consequently the ball-cock may be made very compact when necessary and there will be no liability of the main valve being forced from its seat by the action of the float. It will also be seen that the filter 16 is so arranged that it only filters the water which passes through the smaller passages liable to be clogged by particles in the water, and said filter in no way interferes with the free flowing of the water through the main valve into the tank or other receptacle.

In Fig. 3 I have illustrated my improved valve as applied to an automatic ejector to automatically lift and discharge water from a cellar, ship, or other place. In this arrangement the valve is identical with that shown in Figs. 1 and 2, excepting that the casing 1 is provided with a wall 29, which separates the outlet 3 from that part of the chamber 11 into which the fluid escapes through the passage 17 in the piston 10, and a perforation 30 through the casing allows of the free escape of fluid from the space above this wall. The lever 15 is arranged so that the rising of the normal level of the water in the cellar will cause the valve 13 to open, and the lowering of the water in the cellar will cause said valve to move toward its seat or exactly opposite to the float in Figs. 1 and 2. The outlet 3 is in open communication with an ejector-nozzle 31, which enters the discharge-pipe 32, said discharge being connected to the sewer or carried to some convenient place outside of the cellar or other receptacle, and said pipe is provided with a bell-shaped lower end 33, substantially as shown. The operation of this ejector is substantially as follows: It is designed that the ejector should be placed within a cavity or box 34 in the lowest part of the cellar or other place from which the water is to be ejected. This box is placed below the floor 35 of the cellar, and the supply-pipe 4 is connected to the pressure-supply. As the level of the water in the box 34 rises the float will rise until it causes the valve 13 to open the passage 12, and by this operation will cause the valve 8 to open and establish free communication between the inlet 2 and outlet 3 in a manner substantially as described in relation to the ball-cock shown in Figs. 1 and 2. The operating pressure from the said supply will thus be discharged through the ejector-nozzle 31 into the discharge-pipe 32, which will cause the water in the cellar to be drawn into the discharge-pipe 32 through the bell-shaped lower end 33 of the discharge-pipe and be carried through said pipe, and thus be discharged from the cellar. When the water in the box 34 reaches the desired level, the float will have lowered sufficiently to cause the valve 13 to close the passage 12, when the pressure in the inlet will automatically close the valve 8. It will be understood that steam, compressed air, or other similar force may be used in the supply-pipe, if so desired, and that any liquid may be discharged by my ejector, if so desired.

By the construction of my improved valve as herein described, in which the main valve 8 is normally held upon its seat by the inlet-pressure, I am enabled to more easily keep the valve from leaking, as its tendency is to press more closely against its seat and not to be forced from the seat by said inlet-pressure.

By having my improved valve so arranged that the main valve is forced from its seat to open communication between the inlet and outlet by the action of the same inlet-pressure which normally holds it upon its seat, which pressure for the purpose of opening said valve acts upon a piston of greater area than that of the valve, and by controlling the admission of this inlet-pressure to said piston by means of the manipulation of a secondary valve I am able to make this secondary valve of comparatively small area, and thereby make it very easy of operation. This is particularly desirable when my improved valve is used as a ball-cock, as illustrated in Figs. 1 and 2, as by this means I am able to use a very small float to operate the secondary valve and also can use a short lever in connection with the float, thereby saving space and making the ball-cock less clumsy. By making the passage to exhaust the pressure from the piston so that it may be checked more or less, as desired, I am able to regulate the speed of the movement of the main valve when closing, and thereby prevent any sudden movement of the valve tending to produce what is known as "water-hammering." By using my improved valve in a ball-cock, in which it is both opened and closed by the inlet-pressure, and by regulating the speed of its movements by cramping the passages which cause its operation more or less, as desired,—I am able to have it work positively, as the valve will complete its entire movement when it has once started, and thus fully close or open the valve, thereby preventing the disagreeable drizzling and whistling of the common ball-cock when it commences to open and just before it finally closes.

It will be understood that the exhaust-passage 17 may be dispensed with and the piston 10 be made to fit sufficiently loose within the chamber 11 as to allow the pressure in said chamber to be gradually reduced by the leakage around said piston, if so desired, without departing from my invention. It will also be understood that in lieu of using a reciprocating piston 10 within the chamber 11 its well-known mechanical equivalent—a flexible diaphragm—may be used with substantially equal advantage and within the scope of my invention.

Having thus fully described the nature, construction, and operation of my invention, I wish to secure by Letters Patent and claim—

1. In a valve, an inclosing casing, an inlet and outlet thereto, a main valve controlling communication between said inlet and outlet normally held upon its seat by the inlet-pressure and moving with the flow of the fluid through said valve when closing, a chamber, a piston in said chamber in equilibrium when the valve is at rest, a passage forming communication between said inlet and said chamber to convey the inlet-pressure to said chamber and thereby cause said piston to act in opposition to the inlet-pressure on said valve to open the valve, a secondary valve seated against the inlet-pressure in said passage and controlling said passage, a float controlling said secondary valve, whereby the main and secondary valves move in opposite directions when the secondary valve is operated to cause the main valve to open and whereby both valves are moved in the same direction, after the secondary valve has been operated to cause the main valve to be closed, by the action of the inlet-pressure, thus insuring a positive, rapid and complete movement of the main valve in both directions, for the purpose set forth.

2. In a valve, in combination with a casing having an inlet-passage and a restricted outlet-passage, a piston-valve arranged to be subjected at one side to a high pressure and to a low pressure, and on the other side to a pressure intermediate between the high pressure and the low pressure, a passage leading from the high-pressure chamber to the intermediate-pressure chamber, and a passage leading from the intermediate-pressure chamber to the low-pressure chamber, whereby the valve will be balanced while open, and means for automatically closing the passage leading from the high-pressure chamber to the intermediate-pressure chamber so as to close the valve, for the purpose set forth.

3. A valve-casing having inlet and outlet passages, a main valve controlling communication between said passages, a piston controlling said valve, a passage to supply inlet-pressure from said inlet-passage to said piston to cause the main valve to open, a secondary valve controlling said latter passage, the piston during its movement in opening the main valve gradually contracting said outlet-passage of the casing to retain a gradually-increasing amount of pressure between the outlet from the casing and the piston to act upon the piston in opposition to the inlet-pressure thereon, in order to gradually balance said valve and the piston acting on said valve, while the secondary valve is open, and a contracted exhaust-port to relieve the inlet-pressure from acting on said piston in order to allow the main valve to close when the secondary valve is closed, for the purpose set forth.

In testimony whereof I have affixed my signature in presence of two witnesses.

NELSON CURTIS.

Witnesses:
HENRY CHADBOURN,
S. BAYARD THOMPSON.